3,241,907
PROCESS FOR THE DYEING OF CELLULOSE ESTERS
Jose Carbonell and Hans Ruckstuhl, Basel, and Walter Wehrli, Riehen, Switzerland, assignors to Sandoz Ltd., Basel, Switzerland
No Drawing. Filed Aug. 21, 1963, Ser. No. 303,673
Claims priority, application Switzerland, Aug. 26, 1962, 10,161/62
9 Claims. (Cl. 8—86)

Cellulose esters, in particular secondary cellulose acetate and cellulose triacetate, are frequently dyed with disperse dyestuffs. The cellulose esters may be in the form of filament, fiber, slubbing, yarn, fleece, knitted or woven fabric, or other textile or non-textile material, and they are dyed with disperse dyestuffs from aqueous dispersion and the dyeings fixed at a high temperature in the dyebath itself or in other equipment. Another, less frequently employed dyeing method for cellulose esters is to impregnante the material with an aqueous solution or dispersion of dyestuff, generally acid metal complex dyestuffs, dyestuffs containing metallizable groups, acid wool dyestuffs free from metallizable groups, diazotizable or vat dyestuffs. The impregnated materials are subsequently metallised when metallizable dyestuffs are used.

It has now been found that deeper and faster dyeings on cellulose esters are obtained when aminosulfonic acid arylester is employed as a dyeing assistant. Preferred compounds are those of the formula

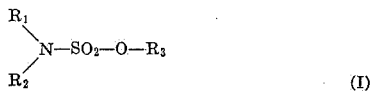

in which $R_1$ and $R_2$ represent identical or different, substituted or unsubstituted alkyl groups with 1 to 4 carbon atoms or together with the nitrogen atom form a substituted or unsubstituted heterocyclic ring, and in which $R_3$ represents aryl radicals which may be substituted by halogen atoms, by low molecular alkyl or alkoxy groups.

Examples of particularly suitable aminosulfonic acid arylesters are the phenyl esters of N,N-dimethylaminosulfonic acid or N,N-diethylaminosulfonic acid, the 4-chlorophenylester of N,N-dimethylaminosulfonic acid and the 2,4-dimethylphenylester of N,N-diethylaminosulfonic acid.

The process of the invention has the advantage that it can be employed to dye cellulose esters, preferably cellulose triacetate, to heavy shades of good fastness with dyestuffs composed of large molecules.

The compounds of Formula I can be employed alone or in mixture. Generally amounts of about 0.5% to 50%, calculated on the weight of the cellulose ester to be dyed, are used. Particularly good results are obtained with 5-30%. They can be added to the dyeing medium employed for impregnating the material. Alternatively the material can be treated with a compound of Formula I prior to dyeing.

It is advantageous to disperse the assistant in the dyebath or the pre-treating bath with emulsifiers. Suitable emulsifiers are, for example, ethoxylated fatty alcohols or alkyl phenols, polyethylene glycol, the salts of sulfonated alkyl polyether alcohols, alkylaryl sulfonic acids, and sulfonated oils.

The class of disperse dyestuffs has been frequently defined in the literature. It comprises water-insoluble dyestuffs which were originally introduced for dyeing secondary cellulose triacetate and are applied from finely divided, aqueous dispersions, [Journal of the Society of Dyers and Colourists, 69, 121 (1953); 74, 815 (1958); 77, 247 (1961); Colour Index, volume I, 1665 (1955)]. In this context water-insoluble signifies that the dyestuffs are free from sulfonic acid and carboxylic groups, and/or their salts. Their solubility in water is generally less than 100 milligrams, and usually between about 0.2 and 20 milligrams, per liter of bidistilled water at 60° C. (140° F.). For the greater part, they belong to the series of the azo, anthraquinone, nitro, perinone, azomethine and quinophthalone dyestuffs. Important groups of dyestuffs belonging to these series are described for example, in the following patents: Belgian Patent 592,096, Belgian Patent 604,720, French Patent 1,167,-704; and in the Colour Index under: C.I. Disperse Yellow 23, 26,070, C.I. Disperse Blue 19, 61,110, C.I. Disperse Black 7, 11,035.

Most of the commercially available disperse dyestuffs contain particles of approximately 0.01 to 10 microns in size, with the majority betwen 0.1 and 5 microns.

As used here, the term "acid wool dyestuffs" refers preferably to water-soluble monoazo dyestuffs which contain as water-solubilising groups, for example, sulfonic acid and/or carboxylic acid groups. Metal complex dyestuffs and metallizable dyestuffs are those which contain in ortho, ortho'-position to an azo group a metallizable group or a group convertible into a metallizable group, e.g. hydroxyl, carboxyl, alkoxy or amino groups. The preferred metals for complex formation are chromium, cobalt, nickel, copper, zinc and iron and the complexes are formed in the ratio of 1:1 and/or 1:2 metal to dyestuff. Mono-, dis- and poly-azo dyestuffs are suitable for conversion into metal complex dyestuffs. The metallizing reaction can be carried out in substance or on the fiber, preferably in aqueous-alkaline solution and/or an organic medium, the metal compound being added to this in alkaline solution with the addition of a complexing agent such as tartaric, citric, oxalic and/or lactic acid. Suitable chromium compounds are e.g. chromium trifluoride, chromic sulfate, chromic formate, chromic acetate, chromic potassium sulfate and chromic ammonium sulfate. The chromates, e.g. sodium or potassium bichromate, are very valuable compounds for the metallization of metallizable monoazo dyestuffs. Examples of suitable cobalt compounds are cobaltous acetate and cobaltous sulfate. Ferrous chloride and ferrous sulfate are examples of suitable iron compounds. Important copper and nickel compounds are e.g. copper sulfate, copper acetate and nickel sulfate. Particularly important examples of these dyestuffs are e.g. those described in French Patents Nos. 1,103,828 and 1,079,852 and in the Colour Index under C.I. Acid Blue 51, 62,145.

For dyeing cellulose esters, preferably cellulose triacetate, by the process of the invention, water-insoluble diazotizable bases can be used with equally good success such as are defined in the Colour Index, vol. II, 2569 (1955), e.g., C.I. Disperse Black 1 (11,365) and C.I. Azoic Diazo Component 5 (37,125), in combination with coupling components of the naphthol series which are also defined in the Colour Index (loc. cit.), e.g. C.I. Developer 8 (3-hydroxy-2-naphthoic acid) and C.I. Azoic Coupling Components 15 (37,600).

The base is applied to the substrate by the process of the present invention, then the material is rinsed and coupled in a fresh bath with the coupling component, preferably in the presence of an anionic dispersing agent such as Turkey red oil. Finally the base is diazotized with sodium nitrite in hydrochloric acid solution, i.e. the diazonium salt is coupled with the coupling component to form the corresponding dyestuff.

The process of the invention can also be carried out with good success using vat dyestuffs. Examples of suitable vat dyestuffs are C.I. Vat Red 6, 73,355, and C.I. Vat Red 45, 73,860.

The vat dyestuffs are applied in the form of their vat acids and in the presence of a mild reducing agent, e.g.

formamidine-sulfonic acid. In the case of cellulose triacetate materials padding is the preferred method of application.

Apart from the use of aminosulfonic acid aryl esters, the techniques for the coloration of cellulose esters are well known. They can be exhaustion dyed at a long liquor ratio, padded or printed. The amounts of dyestuff applied range from approximately 0.01 to 5 grams per 100 grams of the material. The optimum pH region is about 2–9 or preferably 4–8. The dyeing temperatures generally chosen are from 70 to 140° C.; for secondary cellulose acetate the preferred temperature range is up to 80° C. and for cellulose triacetate up to 115° C. In exhaustion dyeing at long liquor ratios the goods are treated for about 30–90 minutes. The liquor ratio can vary within wide limits, e.g. between 1:3 and 1:200 or preferably between 1:30 and 1:80. In padding the dyestuff concentration is 0.01 to 150 or preferably 0.1 to 100 grams per liter padding liquor and in printing from about 0.1 to 150 grams per kilogram print paste.

The use of aminosulfonic acid aryl esters does not exclude the employment of the normally used assistants. Disperse dyestuffs are applied with the commonly used dispersing agents, which are preferably anionic or non-ionic and may also be employed in mixture with each other. About 0.5 gram of dispersing agent per liter of the dyebath or padding liquor is often sufficient, but larger amounts, e.g. up to about 3 grams per liter can be employed. Amounts higher than 5 grams per liter offer no special advantage. Known anionic dispersing agents which can be used in the process are, for example, the condensation products of naphthalenesulfonic acids and formaldehyde, in particular dinaphthylmethane disulfonates, the esters of sulfonated succinic acid, Turkey red oil and the alkali salts of sulfuric acid esters of fatty alcohols, e.g. sodium lauryl sulfate, sodium cetyl sulfate, sulfite cellulose waste liquor and their alkali salts, soaps or alkali sulfates of monoglycerides of fatty acids. Examples of known and particularly suitable non-ionic dispersing agents are the addition products of approximately 3–40 moles of ethylene oxide and alkyl phenols, fatty alcohols or fatty amines, and their neutral sulfuric acid esters.

In padding and printing the normal thickening agents are employed, for example, modified or unmodified natural products such as sodium alginates, British gum, gum arabic, crystal gum, locust bean gum, gum tragacanth, carboxy-methyl-cellulose, hydroxy methyl cellulose, starches and synthetic products such as polyacrylamides and polyvinyl alcohols.

In the application of dyestuffs of many classes, for example, wool dyestuffs, the presence of electrolytes is desirable. These can be added in the normal amounts, e.g. sodium chloride or calcined sodium sulfate in amounts of up to about 30%, and ammonium sulfate, mineral acids, e.g. sulfuric acid, or strong organic acids, e.g. formic or acetic acid, in amounts of between about 1% and 4%, calculated on the weight of the material to be dyed.

The dyeings and paddings are generally fixed in the fiber by heat treatment. This treatment can be carried out in the dye-bath or subsequently to dyeing or padding, by exposure to dry or wet heat. For this purpose the goods are generally heated to about 100–140° C. (212–184° F.) in the presence of water vapour or to (150–235° C. (302–455° F.) in dry heat.

The cellulose ester fibers to be dyed may be present in a blend with other artificial or preferably with natural or regenerated fibers. Blended fabrics of cellulose acetate and wool or cellulose acetate and cotton can be treated in the way described above. When dyed with disperse dyestuffs the wool or cotton component is reserved. But when acid, metal-containing or metallizable wool dyestuffs are used, blends of cellulose acetate fibers and wool are dyed in a single operation. The same applies to mixtures of cellulose acetate and cotton dyed with vat dyestuffs or with their leuco-sulfuric esters, which are applied preferably by padding techniques. In this case a continuous padding process is possible; in the first padding liquor the dyestuff is applied to the blended fabric, and after drying is fixed by heat treatment. In a second padding liquor containing a reducing agent and adjusted to a pH value of about 2 to 6, the vat dyestuff is reduced and dyes the cellulosic component of the blend, after which it is fixed by the known method, e.g. by steaming, and finally oxidized. Alternatively a semi-continuous procedure can be adopted, for example by applying the reduced vat dyestuff on the jigger.

With the process according to the invention substantially heavier dyeings are obtained than when no aminosulfonic acid aryl ester is employed in the dyeing medium. A further advantage of these dyeing assistants is their ease of removal from the goods, for example by washing, so that there is no danger of the fastness properties being depreciated by residual agent. The dyeings have good to very good fastness properties, e.g. good light and wet fastness, particularly good fastness to washing, steaming, water, swimming pool water and sea water, good fastness to dry cleaning, perspiration, sublimation, heat setting, rubbing, chlorine, peroxide, hypochlorite cross dyeing, pleating and gas fumes.

The parts and percentages in the examples are by weight and the temperatures are in degrees centigrade.

*Example 1*

An emulsion is prepared with 15 parts of N,N-diethylaminosulfonic acid phenyl ester, 3 parts of the condensation product of ethylene oxide and a higher fatty alcohol, and 300 parts of water. This emulsion is added to a dyebath containing 1 part of the dyestuff used in Example 1 of Belgian Patent 592,096 in 2700 parts of water at 50°, 2 parts of sulfite cellulose waste liquor and 6 parts of ammonium sulfate. The dyebath is adjusted to a pH value of about 5 with formic acid 85%. 100 parts of cellulose triacetate yarn in hank form are entered into the bath, which is raised slowly to the boil and maintained at the boil for about 1½ hours. No unpleasant odors are evolved during dyeing. The assistant is not volatile in water steam so that no carrier spots are formed on the goods. When the goods are dyed to shade, they are rinsed in water, aftertreated with a solution of a nonionic or anionic product, rinsed again and dried. The assistant is readily removed by rinsing. The fibers are well penetrated by the dyestuff. The light fastness is not adversely affected by the assistant used. The dyeing obtained is a deep greenish blue and has good fastness properties. Without the use of the assistant the goods are scarcely dyed under these conditions.

*Example 2*

An emulsion is prepared with 20 parts of N,N-dimethylaminosulfonic acid phenyl ester, 4 parts of ethoxylated lauryl alcohol and 400 parts of cold water. It is added to 3600 parts of water at 50° containing 8 parts of ammonium sulfate and sufficient formic acid to obtain a pH value of about 5.

a pH value of about 5. 200 parts of a blended fabric of 50% cellulose triacetate and 50% wool are treated in this bath for 10 minutes at 50°. Then 1.7 parts of the dyestuff of Example 8 of French Patent 1,167,704 and 2 parts of sodium dinaphthylmethane disulfonate are added. The bath is heated slowly to the boil and the goods dyed for 1–2 hours. After dyeing the goods are treated further as described in Example 1. The cellulose triacetate component of the blended fabric is dyed an intense dark red while the wool component is well reserved. In the absence of the assistant the wool component is heavily stained.

Equally good results can be obtained by the procedure of Examples 1 and 2 using mixtures of dyestuffs, e.g. as described in Belgian patent 604,720.

Blended fabrics of cellulose triacetate and cotton can be dyed by the procedures of Examples 1 or 2 with equally good results. The cotton is well reserved.

Example 3

10 parts of N,N-diethylaminosulfonic acid 2,4-dimethylphenyl ester are emulsified in 120 parts of water with the aid of 2 parts of an ethoxylated ester of oleic acid. This emulsion is added to a dyebath consisting of 1 part of the dyestuff C.I. Disperse Yellow 23 (26070), 0.65 parts of cellulose sulfite waste liquor and 1880 parts of water at 40°. The dyebath is adjusted to pH 6 with acetic acid. 100 parts of secondary cellulose triacetate filament yarn are entered into this bath and the temperature is increased slowly to 70°. The dyeing time is approximately 1 hour. The dyed yarn is subsequently rinsed in cold water. It is dyed to a deep yellow, while without the use of the assistant only a light pastel shade of yellow is obtained.

In place of Disperse Yellow 23, C.I. Disperse Orange 5, 11,100, or C.I. Disperse Blue 19, 61,110, or mixtures of these dyestuffs can be used with equally good success.

Example 4

2.5 parts of the dyestuff of Example 5 of French Patent No. 1,079,852 and 3 parts of ammonium sulfate are dissolved in 1900 parts of water at 40°. To this dyebath an emulsion of 6 parts of N,N-dimethylaminosulfonic acid-2-naphthylester, 1.2 parts of a polyglycol ether of a fatty acid amide, and 100 parts of water are added. 100 parts of a blended fabric of cellulose triacetate and wool are entered into this bath, which is then heated slowly to the boil and held at the boil for 1–2 hours until the goods are on shade. After subsequent rinsing, a red-orange dyeing is obtained on both fibers which has good fastness properties.

A fabric of secondary cellulose acetate or cellulose triacetate can be dyed in the same way at 75° or 100° respectively with equally good results using the dyestuffs of Examples 1 to 3 of French Patent 1,103,828, or mixtures of these dyestuffs, and the 4-methylphenyl ester of morpholinesulfonic acid as assistant.

Example 5

An emulsion of 6 parts of the phenyl ester of N,N-dimethylaminosulfonic acid, 1.2 parts of a polyglycol ether of an aromatic fatty acid amide and 60 parts of water is added to a solution of 2 parts of C.I. Acid Blue 51 (No. 62,145) and 1 part of ammonium sulfate in 1940 parts of water at about 30°. 100 parts of a fabric of secondary cellulose acetate are entered into this bath, the temperature raised to about 75° and dyeing continued for about 1 hour. The fabric is rinsed in cold water. A deep brilliant blue dyeing is obtained.

Example 6

A 15% aqueous emulsion of the 4-chlorophenyl ester of N,N-dimethylaminosulfonic acid is run into a bath consisting of 6 parts of C.I. Disperse Black 1, (11,365), 3.7 parts of sodium dinaphthylmethane disulfonate and 3850 parts of water at 50°. 100 parts of cellulose triacetate are entered into the bath, the temperature raised to 90° C. and the goods dyed for 90 minutes at this temperature. After rinsing, they are entered into a fresh bath containing 9 parts of C.I. Developer 8 (3-hydroxy-2-naphthoic acid), pasted with 9 parts of sodium hydroxide solution, and 0.5 part of sodium dinaphthylmethane disulfonate in 3900 parts of water. The pH value of the bath is adjusted to about 3.5 with formic or sulfuric acid. The material is dyed for 90 minutes at about 80°, rinsed, and entered into a fresh diazotizing bath containing 5 parts of sodium nitrite and 15 parts of sulfuric acid of 32° Tw., which is heated to 60° in about 15 minutes and maintained at this temperature for about 30 minutes. The dyed material is subsequently treated in a 0.2% solution of an oxethylated fatty alcohol for 30 minutes at 95°.

A deep fast black dyeing is obtained.

When C.I. Azoic Diazo Component 5 (37,125) and C.I. Azoic Coupling Component 15 (37,600) are used in place of C.I. Disperse Black 1 (11,365) and C.I. Developer 8, under the conditions of Example 6 a dyeing is obtained with a deep red-brown shade and equally good fastness properties.

When the dyeing procedure described above is employed but without the addition of the 4-chlorophenyl-ester of N,N-dimethylaminosulfonic acid, in both cases only light shades are obtained.

Example 7

20 parts of N,N-dimethylaminosulfonic acid-4-chlorophenyl ester are emulsified in 150 parts of water as in Example 1 and the emulsion added with stirring to a padding liquor containing 15 parts of the dyestuff mixture used in Example 18 of Belgian Patent 592,096, 850 parts of water, 25 parts of sulfite cellulose waste liquor, 2 parts of sodium alginate and 2 parts of ammonium sulfate. A cellulose triacetate fabric is padded with this liquor and squeezed to a pick-up of 80%. It is then dried at about 110°, and the dyeing fixed in dry heat at about 180–235° for about 45–60 seconds, or with steam at about 115–150° for 1–3 minutes, or in a conditioning chamber with steam at about 105–110° for about 2–8 hours. It is then rinsed, aftertreated with about 0.5–3 parts per liter of a polyglycol ether of a fatty acid amide for about 10 minutes at 100°, rinsed again and dried. A deep greenish navy blue dyeing having good light fastness properties is obtained.

Example 8

An aqueous emulsion of 80 parts of the phenyl ester of N,N-diethylaminosulfonic acid is added to a padding liquor of 50 parts of C.I. Vat Red 45 (73,860), 80 parts of formamidine sulfonic acid and 100 parts of a 6% gum tragacanth solution. This padding liquor is applied to a cellulose triacetate fabric and the fabric squeezed to a pickup of 70–75%. Without intermediate drying, it is fixed by steaming for 10 minutes at atmospheric pressure or at a pressure of 1.5 atmospheres. The reduced dyeing is oxidized for 30 minutes in a bath at 80° containing 6 parts of potassium bichromate and 4 parts of acetic acid 50% per liter.

Example 9

25 parts of the dyestuff mixture described in Example 53 of Belgian Patent 604,720 are mixed with 30 parts of sodium dinaphthylmethane-disulfonate, 12 parts of sodium alginate swelled in 488 parts of water, 35 parts of a mixture of N,N-diethylaminosulfonic acid-4-bromophenylester and a condensation product of ethylene oxide with a higher alcohol, and 410 parts of water to give a printing paste. This paste is printed on cellulose triacetate fabric in the usual way and dried. The print is fixed by steaming for 45 minutes at atmospheric pressure or at 1.5 atmospheres pressure, or by treating in dry heat for 10–180 seconds at about 180–235°. The material is then rinsed and after-treated as described in Example 5. As aftertreating agent 2 parts of olive oil soap per liter water can be used. The print has good fastness properties and is of a deep dark brown shade.

N:N - dimethylamino sulfonic acid - 4 - methylphenyl ester, the N:N-diethylamino - sulfonic acid-4-methylphenyl ester, the N:N-dimethylaminosulfonic acid-2-methoxyphenylester, the N:N-dimethylaminosulfonic acid-4-ethoxyphenylester, the N:N-di-n-butylaminosulfonic acid-1-naphthylester, the N:N-di-methylaminosulfonic acid-4-isoamylphenylester or the phenylester of morpholinosulfonic acid can be used as assistants with equally good results.

In place of the dyestuffs of Belgian patent 604,720 acid wool dyestuffs can be used with equally good results, e.g.

C.I. Acid Yellow 61, C.I. Acid Red 27, 17,045, C.I. Acid Blue 40, 62,125.

Having thus disclosed the invention what we claim is:

1. A process for the coloration of secondary cellulose acetate and cellulose-triacetate which consists essentially in applying an aqueous medium containing a dyestuff in a finely divided state and as dyeing assistant aminosulfonic acid arylester of the formula

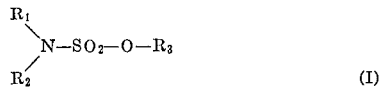

in which $R_1$ and $R_2$ each independently represents lower alkyl and together with the nitrogen atom represent the morpholine ring and $R_3$ represents phenyl, chlorophenyl, bromophenyl, lower alkylphenyl, di-(lower alkyl)-phenyl, lower alkoxyphenyl and naphthyl and fixing the dyestuff on the material by heat treatment.

2. A process for the coloration of secondary cellulose acetate and cellulose-triacetate which consists essentially in applying an aqueous medium containing a dyestuff in a finely divided state and as dyeing assistant aminosulfonic acid arylester of the formula

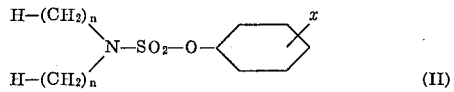

in which $n$ is an integer of at most 2,
$x$ is a member selected from the groups consisting of hydrogen, chlorine, bromine, methyl, methoxy, ethoxy and amyl.

3. A process according to claim 1, wherein a mixture of the aminosulfonic acid arylesters of the formula (I) is employed.

4. A process according to claim 2, wherein a mixture of the aminosulfonic acid arylesters of the formula (II) is employed.

5. A process according to claim 1, wherein the heat treatment consists in applying dry heat at temperatures from 180 up to 230° C. to fix the coloration on the material.

6. A process according to claim 1, wherein the heat treatment consists in applying wet heat at temperatures from 90 up to 150° C. to fix the coloration on the material.

7. A process according to claim 1, wherein the applied dyestuff is selected from the class consisting of disperse, acid wool, metallizable, metallized, vat and diazotable dyestuffs.

8. A process according to claim 6, wherein a mixture of dyestuffs of one of the classes of disperse, acid wool, metallizable, metallized, vat and diazotable dyestuffs is applied.

9. The colored and fixed material according to claim 1.

No references cited.

NORMAN G. TORCHIN, *Primary Examiner.*

J. HERBERT, *Assistant Examiner.*